United States Patent [19]
Masui

[11] 3,735,250
[45] May 22, 1973

[54] FAULT DETECTING APPARATUS FOR A CAPACITOR TYPE POTENTIAL DIVIDER HAVING AN AMPLIFIER

[75] Inventor: Michio Masui, Tokyo, Japan

[73] Assignee: Tokyo Shibaura Electric Company, Ltd., Kawasaki-shi, Japan

[22] Filed: July 1, 1971

[21] Appl. No.: 158,832

[30] Foreign Application Priority Data
July 8, 1970 Japan...............................45/59212

[52] U.S. Cl.....................324/51, 317/27, 340/253 R
[51] Int. Cl. .............................................G01r 31/02
[58] Field of Search.........................324/51, 54, 126; 317/12, 26, 27; 340/253, 255

[56] References Cited
UNITED STATES PATENTS

| | | | |
|---|---|---|---|
| 2,307,499 | 1/1943 | Frakes | 324/54 |
| 2,889,395 | 6/1959 | Frakes | 324/54 X |
| 3,467,858 | 9/1969 | Burnett | 324/96 X |
| 3,486,073 | 12/1969 | Eriksson et al. | 317/26 X |

FOREIGN PATENTS OR APPLICATIONS

| | | | |
|---|---|---|---|
| 923,292 | 4/1963 | Great Britain | 324/51 |

Primary Examiner—Gerard R. Strecker
Attorney—Norman F. Oblon, Stanley P. Fisher and Marvin J. Spivak

[57] ABSTRACT

A capacitor type potential divider having an amplifier is provided with a pair of capacitor units respectively connected to the same phase line of A.C. polyphase power lines. A divided voltage derived from one of the capacitor units is applied through an amplifier to a protecting relay system and/or a voltage measuring device for the polyphase power lines. The output of the amplifier and the divided voltage derived from the other capacitor unit are applied to a comparator for enabling a difference voltage therebetween to be obtained. The difference voltage is then employed to energize a fault detection relay for enabling a fault in the capacitor type potential divider to be detected.

7 Claims, 2 Drawing Figures

Patented May 22, 1973

3,735,250

INVENTOR
MICHIO MASUI

BY Oblon, Fisher & Spivak
ATTORNEYS

FAULT DETECTING APPARATUS FOR A CAPACITOR TYPE POTENTIAL DIVIDER HAVING AN AMPLIFIER

BACKGROUND OF THE INVENTION

1. Field of the Invention

The present invention relates to a fault detecting apparatus for a capacitor type potential divider having an amplifier.

2. Description of the Prior Art

It is known that capacitor type potential dividers having an amplifier are generally inexpensive to manufacture, since the same can utilize as the voltage divider a condenser cone, which is a part of a cable head, a current transformer, a lead-out bushing and the like that has been already installed.

It is also well known that even if an exclusive capacitor unit was provided for deriving a divided voltage from a high voltage line, that a small size capacitor unit having a small capacity could be employed, since the amplifier thereof would operate to supply a high electric power which was sufficient to energize a measuring device or a protecting relay system.

While somewhat satisfactory, the prior art capacitor type potential dividers having an amplifier failed to provide for a means for enabling faults which might occur in the voltage dividing unit and amplifier themselves to be readily detected.

SUMMARY OF THE INVENTION

Accordingly, it is an object of the present invention to provide a new and improved unique fault detecting apparatus for a capacitor type potential divider having an amplifier.

Another object of this invention is to provide a new and improved unique fault detecting apparatus for a capacitor type potential divider having an amplifier which is capable of readily enabling a fault in any of the parts thereof to be detected.

Still another object of the present invention is to provide a new and improved unique fault detecting apparatus for a capacitor type potential divider having an amplifier which is inexpensive to manufacture.

Briefly, in accordance with this invention, these and other objects are in one aspect attained by the provision of first and second capacitor units which are respectively connected to the same phase line of A.C. polyphase power lines. A divided voltage derived from the first capacitor unit is connected through an amplifier to a measuring device and/or a protecting relay system for energization thereof. A comparator is provided for generating a difference output voltage by comparing the divided voltage derived from the second capacitor unit with an output obtained from the amplifier. A fault detecting relay device is connected to the output of the comparator for responding to a difference in the output voltage thereof.

BRIEF DESCRIPTION OF THE DRAWINGS

A more complete appreciation of this invention will be readily obtained as the same becomes understood by reference to the following detailed description when considered in connection with the accompanying drawings wherein.

DETAILED DESCRIPTION OF THE PREFERRED EMBODIMENTS

Figure 1:
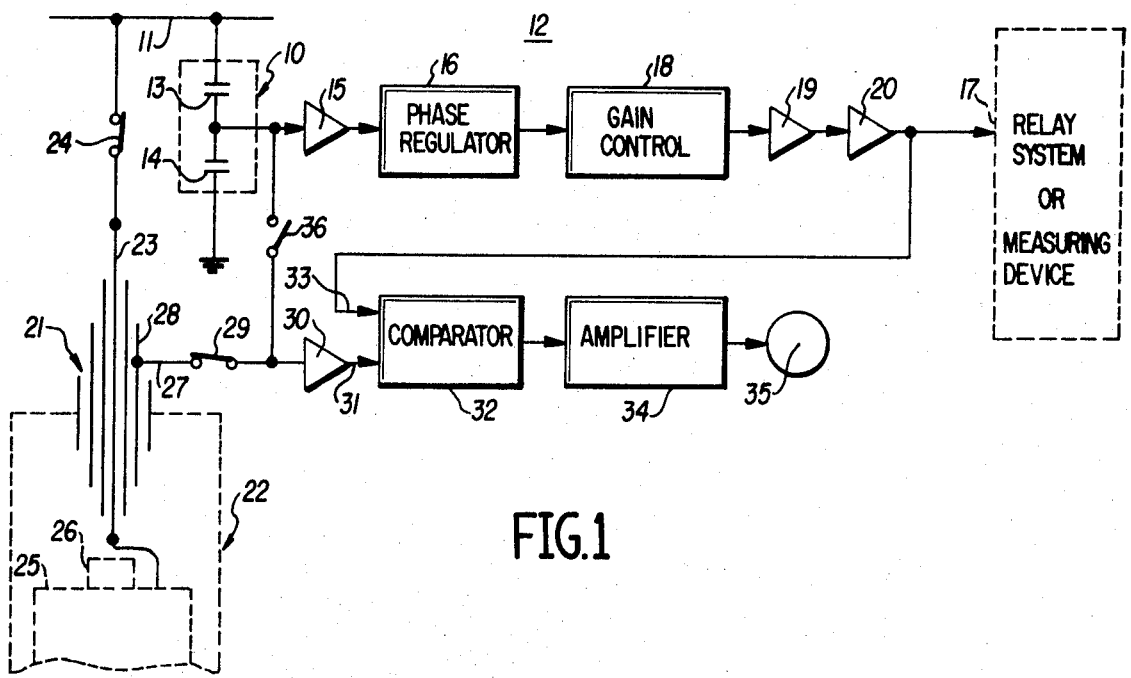
FIG. 1 is a block diagram of one preferred embodiment of a fault detecting apparatus for a capacitor type potential divider having an amplifier in accordance with the teachings of the present invention.

Referring now to the drawings, wherein like reference numerals designate identical or corresponding parts throughout both views, and more particularly to FIG. 1 thereof, wherein one preferred embodiment of a fault detecting apparatus, for a capacitor type potential divider having an amplifier in accordance with the present invention is shown as including a first capacitor unit 10 connected to a phase line 11 of A.C. polyphase lines and an amplifier device 12. The capacitor unit 10 includes a pair of capacitors 13 and 14 which are serially connected between the phase line 11 and ground. A divided voltage is therefore available at a terminal between the capacitors 13 and 14.

The divided voltage so obtained is then amplified through a conventional preamplifier 15 and then applied to a conventional phase regulating circuit 16 which acts to cause the phase of the output voltage of the preamplifier 15 to coincide with the phase of the voltage on the line 11. It should be understood that such phase regulation is necessary in order to regularly effect a phase comparison between the output voltage of the amplifier device device 12 and other electric quantities present, such as the line current on the line 11, in a protecting relay system and/or measuring device 17 provided for the protection of the polyphase lines.

The output voltage of the phase regulating circuit 16 is then passed through a conventional gain control 18 and is thereby converted into a voltage having a level sufficient after amplification to energize the protecting relay system and/or measuring device 17. The output voltage of the gain control 18 is then amplified through a conventional driving amplifier 19 and a conventional power amplifier 20 which thereby generates an electric output power sufficient to be applied to the relay system and/or measuring device 17.

In accordance with this embodiment, a condenser cone type lead-out bushing 21 of an electric power transformer 22, which has a center rod conductor 23 connected to the phase line 11 through a switch 24, is employed as a second capacitor unit. The center rod conductor 23 is connected at the lower end thereof to a winding 25 wound on an iron core 26. As is well known, a terminal lead wire 27 is led out of a metallic foil electrode 28 of the bushing 21 and acts to relieve the radial electric field of the bushing 21 and to enable a divided voltage to be obtained therefrom. The divided voltage obtained from the lead wire 27 is then connected through a switch 29 to a conventional preamplifier 30 so as to energize one input 31 of a conventional comparator 32. The comparator 32 is connected to a conventional amplifier 34 which provides an output for driving an inspection relay 35.

It should be understood that in the absence of the detection of any faults in the electronic components of the capacitor divider that the voltage level of both of the inputs 31 and 33 will be at equal values due to the gain control of the preamplifier 30 and thus no output will occur from the comparator 32 for energization of the inspection relay 35. However, if any fault should occur, for example, in the amplifiers 15, 19, 20 or 30, the phase regulating circuit 16 or the gain control 18, then a difference will occur in the voltage levels of the inputs 31 and 33 of the comparator 32. When the difference output voltage of the comparator 32 exceeds a predetermined level set in the amplifier 34, the amplifier 34 will then provide an output to operate the relay 35.

Any operation of the relay 35, thus, will show that an internal fault has occured in the amplifier stage 12 and such a detection will thereby prevent any misoperation of the protecting relay system and/or measuring device 17 by the operation of the relay 35.

It can be readily seen that the relay 35 can also operate in response to other faults that may occur in the capacitor unit 10, the output lead conductor thereof, the lead-out bushing 21, the output lead conductor thereof, and the like.

When the transformer 22 is cut off by the switch 24 from the line 11 to enable a periodic inspection, the switch 29 is opened, and then a switch 36 is alternately closed to connect the input of the preamplifier 30 to the input of the preamplifier 15. Under such conditions, the relay 35 will operate only in response to a fault that may occur in the amplifier stage 12 and will not operate in response to a fault that may occur in the capacitor unit 10 and the output lead conductor thereof.

Figure 2:
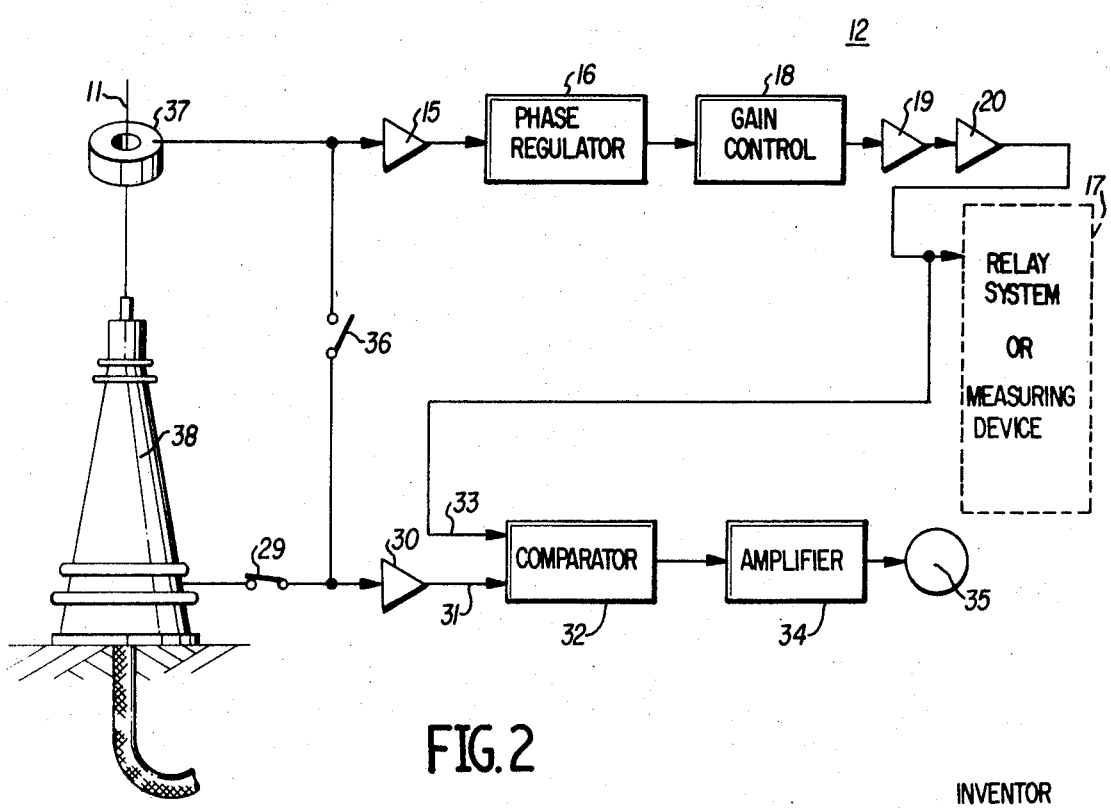
FIG. 2 is a block diagram of an alternative and preferred embodiment of a fault detecting apparatus for a capacitor type potential divider having an amplifier in accordance with the teachings of the present invention.

In accordance with another and alternative embodiment of the present invention as shown in FIG. 2, one electrical quantity or a divided voltage can be derived from a condenser cone of a current transformer 37, and the other electrical quantity or the other divided voltage can be obtained from a condenser cone of a cable head 38. It can be readily understood that the same functions that were achieved in connection with FIG. 1 can also be achieved with this embodiment.

It should now be apparent from the above that in accordance with the teachings of the present invention that since a divided voltage can be derived from a condenser cone of a current transformer, a cable head or a lead-out bushing and the like that it is not necessary to provide exclusive high cost voltage divider units and thereby the cost for installation of a potential divider can be effectively reduced. Moreover, in accordance with the present invention, any internal faults in any of the parts of a capacitor type potential divider having an amplifier can be surely and readily detected.

Obviously, numerous modifications and variations of the present invention are possible in light of the above teachings. Thus, for example, in accordance with the present invention a divided voltage could readily be obtained from numerous other installations, such as a wall bushing. It is therefore to be understood that within the scope of the appended claims the invention may be practiced otherwise than as specifically described herein.

What is claimed as new and desired to be secured by Letters Patent of the United States is:

1. A fault detecting apparatus for a capacitor type potential divider comprising:
    a first capacitor unit connected to a phase line of A.C. polyphase power lines for enabling a divided voltage to be obtained therefrom;
    a second capacitor unit for enabling a divided voltage to be obtained therefrom, said second capacitor unit being connected to the same phase line of said A.C. polyphase power lines to which the first capacitor unit is connected;
    an amplifier device connected to the output of said first capacitor unit;
    monitoring means connected to an output of said amplifier device for monitoring the state of said phase line;
    a comparator having inputs connected to the output of said amplifier device and to the output of said second capacitor unit, said comparator generating an output signal indicating an inequality between said outputs of said amplifier device and said second capacitor unit; and,
    an inspection relay connected to the output of said comparator for responding to said comparator output signal and thereby indicating an internal fault within said first capacitor unit.

2. A fault detecting apparatus for a capacitor type potential divider according to claim 1, wherein:
    at least one of said first and second capacitor units is of an exclusive type and includes serially connected capacitors for enabling the divided voltage to be derived therefrom, and the other unit is formed of another installation provided in the polyphase power lines.

3. A fault detecting apparatus for a capacitor type potential divider according to claim 2, wherein:
    said other capacitor unit is a condenser cone of a lead-out bushing of an electric power transformer.

4. A fault detecting apparatus for a capacitor type potential divider according to claim 2, wherein:
    said other capacitor unit is a condenser cone mounted in a current transformer.

5. A fault detecting apparatus for a capacitor type potential divider according to claim 2, wherein:
    said other capacitor unit is a condenser in a cable head.

6. A fault detecting apparatus for a capacitor type potential divider according to claim 1, wherein:
    one of said first and second capacitor units is a condenser cone mounted in a first electric installation; and
    the other unit is a condenser cone mounted in a second installation.

7. A fault detecting apparatus for a capacitor type potential divider according to claim 1, wherein:
    the input of said comparator which is connected to said second capacitor unit is alternately connected to the input of said amplifier device when said second capacitor unit is disconnected from its circuit.

* * * * *